Patented Apr. 10, 1928.

1,665,693

UNITED STATES PATENT OFFICE.

ELBERT E. FISHER, OF TOLEDO, OHIO, ASSIGNOR OF ONE-HALF TO GEORGE W. BATCHELL, OF TOLEDO, OHIO.

GLASS AND ITS MANUFACTURE.

No Drawing. Application filed April 5, 1927. Serial No. 181,274.

My invention has for its object to produce a glass having an especially good workability or "nature" ("nature" being the term commonly employed in glass factories to refer to the workability or facility of undergoing shaping of glass while in a plastic condition) and also possessing an especially good resistance to weathering and only a very slight solubility. Because of the qualities of the glass produced, according to my invention, as regards "nature" or workability, it is especially suitable for use in the production of plate and window glass, pressed and hollow ware, such, for example, as bottles and table ware and all machine and hand-blown ware. The workability or "nature" of the glass in plastic condition throughout a large temperature range and its rate of cooling and other characteristics are such as to facilitate its formation into desired shapes and permit shaping to be carried out by suitable devices at a greater speed in many instances than is feasible with many other glasses.

In its more specific embodiment, my invention relates to the use of barium sulfate in the manufacture of glass in such a manner as to serve as a flux and hardener aiding in the melting of the batch used in making the glass, enabling a lower temperature than would otherwise be required to be employed for this purpose and thereby reducing the cost of production of the glass by this fuel saving, as well as by a reduction also in the aggregate cost of the batch ingredients used. The use of barium sulfate, according to my invention, also gives to the glass produced a resistance to changes of a spontaneous character or from external influences so that less solubility or bloom is developed than in various otherwise similar glasses made without the use of barium sulfate. Further, glass produced according to my invention has an improved or greater density and also an improved mechanical strength, elasticity and toughness and a decreased brittleness and lower co-efficient of expansion than glass prepared from an otherwise similar batch without the use of barium sulfate.

While my invention is not, as a matter of fact, limited, and I do not wish to be understood as limiting it, to any particular specific formula of associated batch ingredients for making glass, the following comparative formulæ are given as exemplifying the employment of my invention as it may, with the hereinbefore specified and other advantages, be employed in the improvement of glass manufacture as heretofore practiced:

*Typical window glass batch formula not embodying my invention.*

| | |
|---|---|
| Sand | 100 lbs. |
| Soda ash | 28 lbs. |
| Salt cake | 8 lbs. |
| Limestone | 28 lbs. |
| Arsenious oxide | 1 oz. |

*Window glass formula embodying my present invention.*

| | |
|---|---|
| Sand | 100 lbs. |
| Soda ash | 26 lbs. |
| Barium sulfate | 4 lbs. |
| Limestone | 28 lbs. |
| Arsenious oxide (with or without) | 1 oz. |

*Typical batch formula for glass suitable for jars or bottles, not embodying my invention.*

| | |
|---|---|
| Sand | 100 lbs. |
| Soda ash | 48 lbs. |
| Limestone | 16 lbs. |
| Feldspar | 2 lbs. |
| Salt cake | 1 lb. |
| Arsenious oxide | 1 oz. |

*Typical batch formula for glass suitable for jars or bottles embodying my present invention.*

| | |
|---|---|
| Sand | 100 lbs. |
| Soda ash | 37 lbs. |
| Limestone | 20 lbs. |
| Barium sulfate | 3 lbs. |
| Arsenious oxide (with or without) | 1 oz. |

By way of still further exemplification of my invention, reference is made to another typical batch formula for making glass suitable for the manufacture of bottles and similar articles as heretofore used:

| | |
|---|---|
| Sand | 100 lbs. |
| Soda ash | 38 lbs. |
| Burnt lime | 10 lbs. |
| Selenium, approximately | 20 grs. |
| Cobaltic oxide, approximately | 4 grs. |
| Arsenious oxide, approximately | 1 to 2 oz. |

By applying the principle of my invention to a formula of this character, such formula may (although as above stated not restricting myself to specific proportions) be modified by reducing the quantity of soda ash used and by employing limestone instead of burnt lime and employing barium sulfate as an additional batch ingredient, so that instead of the batch formula just referred to the following may, for example, be employed according to my present invention:

| | |
|---|---|
| Sand | 100 lbs. |
| Soda ash | 37 lbs. |
| Limestone | 18 lbs. |
| Barium sulfate | 3 lbs. |
| Selenium, approximately | 20 grs. |
| Cobaltic oxide, approximately | 4 grs. |
| Arsenious oxide, approximately | 1 to 2 oz. |

As will be clearly apparent, my improved formula, while at the same time producing a glass of materially improved characteristics as hereinbefore described, involves also various features of economy in production. Limestone is a less costly ingredient than burnt lime and further, an especial economy is secured by the use of barium sulfate according to my invention, for the reason that the use of barium sulfate reduces, by as much as from 100 to 200° F., the melting temperature required in the tank in which the glass batch ingredients are melted. Melting temperatures of typical glass batches prepared according to my invention and in which barium sulfate is used may range ordinarily from 2400 to 2450° F. as compared with required temperatures of 2500 to 2650° F. in case of generally similar typical batches prepared without the use of barium sulfate.

A further advantage in the use of barium sulfate in the manufacture of glass, according to my present invention, is that it facilitates the production of a glass of excellent brilliance which is an especially desirable characteristic of glass used for either pressed or blown table ware or for various other purposes.

Still further, in many formulæ wherein it has heretofore been deemed necessary, in producing glass for making bottles and similar ware, to use some form or combination comprising alumina, such as feldspart, hydrated alumina, bauxite, clay or lepidolite, it is, when employing barium sulfate, according to my invention, unnecessary to use any form or combination of alumina and thereby is attained a further economy or saving in the heat required for melting the batch, since a considerably higher temperature is required for effecting proper reaction between alumina and silica in a glass batch than is required for reaction between barium sulfate and silica to produce barium silicate.

The barium sulfate used according to my invention may be either a highly purified or manufactured product or it may be in the form of crude barytes which may be directly used as a batch ingredient in pulverized form. Small quantities (which preferably and usually will not exceed 5 to 7% by weight of the barytes used) of substances, such as oxides of iron, aluminum and silicon, which may be naturally associated with the barium sulfate in native barytes, do not preclude its use according to my present invention.

In forming a "batch" for glass manufacture, according to my present invention and in which barium sulfate is employed, as an essential ingredient, the batch is preferably formed without the use of any carbonaceous or other reducing agents, such as have heretofore in certain instances been used and considered necessary in forming glass batches including barium sulfate for the production of transparent glass. According to my invention, by forming the batch without any reducing agents and by melting it without any reducing agents being present at the time of melting, I attain the special advantages among others that selenium or manganese dioxide may be effectually employed as decolorizing agents in my process which is not the case when barium sulfate and carbon or other reducing material are used together.

It is a characteristic feature of glass manufactured according to my present invention that the finished product or glass is clear and transparent and contains a very small quantity or traces of free sulphur which, by appropriate tests and analysis, is clearly identifiable and effective to distinguish glass produced according to my present invention from any of the most nearly similar glasses which have heretofore been produced.

While I do not wish to stand definitely committed as to matters of theory or to restrict my invention in any degree thereby, it appears probable that the presence of such small quantities or traces of free sulphur in the glass either tends in itself to give the glass a lesser solubility than it would otherwise have, or at least that the presence of such free sulphur may be taken as an identifying characteristic of a glass possessing an advantageous lesser solubility than otherwise apparently similar glasses not containing such small quantities of free sulphur, which do not color the glass.

I am aware that it has been proposed to use barium sulfate in the manufacture of "milk" or "alabaster" glass, such a proposal being set forth in the United States Patent No. 210,331, issued November 26, 1878, to Joseph Kempner but, according to the process described in the United States patent just mentioned, barium sulfate is used with feldspar and fluorspar as additional ingredients of a batch also formed with soda, potash and sand and with which the then known so-called "ordinary decoloring" means and, furthermore, charcoal are also incorporated, all for the purpose and with the effect of producing a "milk" or "alabaster" glass. In such a process, the barium sulfate, in combination with the feldspar and fluorspar enters into reactions by reason of which the sulfate of the barium, the alumina of the feldspar and the fluorine of the fluorspar act together giving opacity to the "milk" or "alabaster" glass while, according to my present invention in which barium sulfate is used as a batch ingredient, neither feldspar nor fluorspar is essential as an ingredient and carbon also is not essential, but is preferably not used for reasons hereinbefore stated.

In a process such as described in U. S. patent to Kempner mentioned, the now well-known and generally employed decolorizing agents for glass, such as selenium and manganese dioxide could not be used for the reason that their effect as decolorizing agents would be nullified in a batch of such a composition containing carbon.

I am also aware that it has been proposed, as in United States Patent No. 1,192,048, issued July 25, 1916, to Elias L. Elliott, to employ small proportions of various sulfates, among which barium sulfate is mentioned, for the purpose of providing finely distributed minute particles of such sulfates in a finished glass of translucent light diffusing character, this character being imparted to the glass by the presence of these minute and finely distributed particles of sulfate. The manufacture of such a glass of opalescent or non-transparent character and containing barium sulfate as such in finely distributed particles in the finished glass itself is, of course, quite dissimilar to my present invention.

It is a particularly advantageous feature of my present invention that in connection with the manufacture of glass, according to this invention, a decolorizing agent such as selenium can be used in regulated amount in connection with the process of glass manufacture, so as to effect practically any desired degree of partial or complete decolorization, in order to obtain either a glass of practically any shade of residual green color by partial neutralization of the green color, due to traces of iron which are present in the ordinary batch forming ingredients, or so as to effect a substantially complete elimination of such green color.

This is in marked contradistinction (as hereinabove noted with respect to the process heretofore proposed by Kempner) to such processes as have heretofore been proposed, attempted or employed, in which previous processes a carbonaceous or other reducing agent has been used in the bath and has been present in the glass forming batch when melted, since in such processes when barium sulfate and carbon or other reducing agents of similar character are used together in a glass batch and when, at the same time, elemental or usually so-called "metallic" selenium or its salts, such as sodium selenite or barium selenide are used as decolorizing agents, the carbon or equivalent reducing agent by its action causes the dissipation or volatilization of the selenium so that its decolorizing effect is nullified and the glass, because of such elimination of the selenium, is not properly or permanently decolorized. A similar undesirable effect is also exerted when a manganese compound, such as manganese dioxide, is used as a decolorizing agent in the presence of carbonaceous or similar reducing agents (as heretofore proposed or used) the decolorizing effect of the manganese compound also being nullified. For these reasons, among others, the previous attempts to use barium sulfate as an ingredient in making satisfactory, clear, transparent glasses of good brilliancy have met with but limited or indifferent success and have not been fully satisfactory. Such previously known processes in which barium sulfate is used, either for the purpose of merely producing opalescence in glass or in which the barium sulfate is used with a substantial proportion of a carbonaceous or other reducing agent, free to exert a substantial effect as such, I do not claim as these form no part of my present invention.

When used according to the process of my present invention barium sulfate has the still further advantage that in the manufacture of glasses using batches such as I have described, the barium sulfate serves to keep down or prevent the formation of scum which would otherwise tend to form and be formed upon the surface of the batch when melted.

While I do not limit my invention to any particular, definite proportion of barium sulfate as an ingredient of a glass batch, nevertheless I have ascertained that in the manufacture and utilization of glass batches prepared and used in accord with my present invention and in which no carbonaceous or other reducing agent of similar effect is used, it will ordinarily be preferable, for best results in practical operation, to use the barium sulfate in a proportion of about 4 lbs. or somewhat less of the barium sulfate for each 100 lbs. of sand or silica used in the batch. If too large a quantity of barium sulfate is used in a glass batch of the general character, such as I have described, the objectionable feature is likely to be encountered that a supernatent layer of molten sulfate material (usually termed "salt water" in glass factory parlance) may be formed upon the surface of the molten glass when the glass batch is melted.

When in the claims I specify a "substantial proportion" of barium sulfate, I do not mean to restrict myself to the particular proportions set forth in the formulæ which have been given embodying my invention, but mean such a quantity of barium sulfate as will produce a material effect in determining and fixing the characteristics of the glass which is formed and preferably such a quantity as will, by its presence, result in material advantages as regards facilitating the process of production and the character of the product such as I have hereinbefore described.

When in the claims barium sulfate or other substance is referred to as a "primary ingredient" of the glass-forming batch, this is intended to mean and does mean that barium sulfate or any other specified ingredient of the batch referred to as a "primary ingredient" is used as one of the initial or original ingredients of the glass-forming batch as prepared prior to the melting of the batch.

Having described my invention, what I claim as new and desire to secure by Letters Patent is:

1. A batch for glass production comprising a substantial proportion of barium sulfate as a primary ingredient and producing, when melted, a glass which is capable of being effectively decolorized by selenium and which solidifies to a clear transparent product.

2. A batch for glass production, comprising as essential primary ingredients barium sulfate, silica and glass-forming compounds of sodium and calcium, said batch, when melted, forming a glass capable of being effectively decolorized by selenium and which solidifies to a clear transparent product.

3. In a method of producing a clear transparent glass, the step which comprises melting a glass-forming batch containing a substantial proportion of barium sulfate as a primary ingredient and which when melted is capable of being effectively decolorized by selenium.

4. In a method of producing a clear transparent glass, the step which comprises melting a glass-forming batch comprising as essential primary ingredients barium sulfate, silica and glass-forming compounds of sodium and calcium, said batch, when melted, forming a glass capable of being effectively decolorized by selenium and which solidifies to a clear transparent product.

5. A clear transparent glass resulting from melting a glass-forming batch containing a substantial proportion of barium sulfate as a primary ingredient and which when melted is capable of being effectively decolorized by selenium.

6. A clear transparent glass resulting from melting a glass-forming batch comprising as essential primary ingredients barium sulfate, silica and glass-forming compounds of sodium and calcium, said batch, when melted, being capable of being effectively decolorized by selenium.

7. A clear transparent glass containing chemical compounds of sodium, calcium and barium, said glass being formed by melting a batch comprising a substantial proportion of barium sulfate as one of its essential ingredients and which when melted is capable of being effectively decolorized by selenium.

8. A batch for glass production comprising silica, sodium carbonate and calcium carbonate, together with barium sulfate, as essential ingredients, and producing, when melted, a glass which is capable of being effectively decolorized by selenium and which solidifies to a clear transparent product.

9. In a method of producing a clear transparent glass, the step which comprises melting a glass-forming batch comprising silica, sodium carbonate, calcium carbonate and barium sulfate as essential ingredients, said batch when melted being capable of being effectively decolorized by selenium and possessing the property of solidifying to a clear transparent product.

10. A clear transparent glass produced by the fusion of a glass-forming batch comprising silica, sodium carbonate, calcium carbonate and barium sulfate as essential ingredients, said glass, when in molten condition, being capable of being effectively decolorized by selenium.

11. The method of producing a clear transparent glass which comprises the step of melting a glass-forming batch comprising sand, soda ash, limestone and barium sulfate as essential ingredients, said batch when melted forming a glass capable of being effectively decolorized with selenium, and supplying to the resulting molten product such a proportion of selenium as to effect a substantial degree of decolorization of the glass produced.

12. A clear transparent glass produced by a method comprising the step of melting a glass-forming batch containing sand, soda ash, limestone and barium sulfate as essential ingredients, said batch when melted forming a glass capable of being effectively decolorized with selenium, and supplying to the resulting molten product such a proportion of selenium as to effect a substantial degree of decolorization of the glass produced.

13. The method of producing glass which comprises melting a non-carbonaceous batch of glass-forming ingredients, containing a substantial proportion of barium sulfate and silica, under such conditions as to effect reaction of the barium sulfate and silica and homogeneous dispersion of the barium as a constituent, in combined form, in the glass produced.

14. A clear transparent glass produced by a method comprising melting a non-carbonaceous batch of glass-forming ingredients, containing a substantial proportion of barium sulfate and silica, under such conditions as to effect reaction of the barium sulfate and silica and homogeneous dispersion of the barium as a constituent, in combined form, in the glass produced.

In witness whereof, I have hereunto signed my name to this specification on the 5th day of April, 1927.

ELBERT E. FISHER.